United States Patent
Cline

[15] 3,692,120
[45] Sept. 19, 1972

[54] TILLING APPARATUS

[72] Inventor: Ted L. Cline, P.O. Box 38, Rush Springs, Okla. 73082

[22] Filed: May 13, 1970

[21] Appl. No.: 36,929

[52] U.S. Cl. ............... 172/151, 172/177, 172/200, 172/540
[51] Int. Cl. .................. A01b 49/02, A01b 21/02
[58] Field of Search ................. 172/200, 175–177, 172/196, 315, 316, 554, 540, 667, 668, 193, 184, 393

[56] References Cited

UNITED STATES PATENTS

| | | | |
|---|---|---|---|
| 1,082,430 | 12/1913 | Mallory | 172/200 |
| 2,138,904 | 12/1938 | Carswell | 172/151 X |
| 2,200,631 | 5/1940 | Merlich | 172/177 |
| 2,569,464 | 10/1951 | Edwards et al. | 172/149 |
| 3,437,061 | 4/1969 | Wells | 172/540 X |
| 2,669,173 | 2/1954 | Severance | 172/200 X |

Primary Examiner—Robert E. Pulfrey
Assistant Examiner—Stephen C. Pellegrino
Attorney—Dunlap, Laney, Hessin & Dougherty

[57] ABSTRACT

There is provided a frame having on one end thereof means, such as a chisel plow, for scarifying the earth. Near the rear portion of the frame, in a position behind the plow, means is located for pulverizing earth thrown up by the plow. The pulverizing means may include one or more reel structures, each of which has a plurality of horizontally-extending, radially disposed blades secured to and rotatable with one or more horizontal axes. In addition, adjusting means are provided for rotating the pulverizing means in a limited arc around a portion of the rear of the plow to increase or decrease the depth of operation of the pulverizing means. If desired, a leveling blade may be secured to a portion of the pulverizing means to provide additional smoothing to the earth over which the apparatus is drawn.

13 Claims, 5 Drawing Figures

INVENTOR
TED L. CLINE

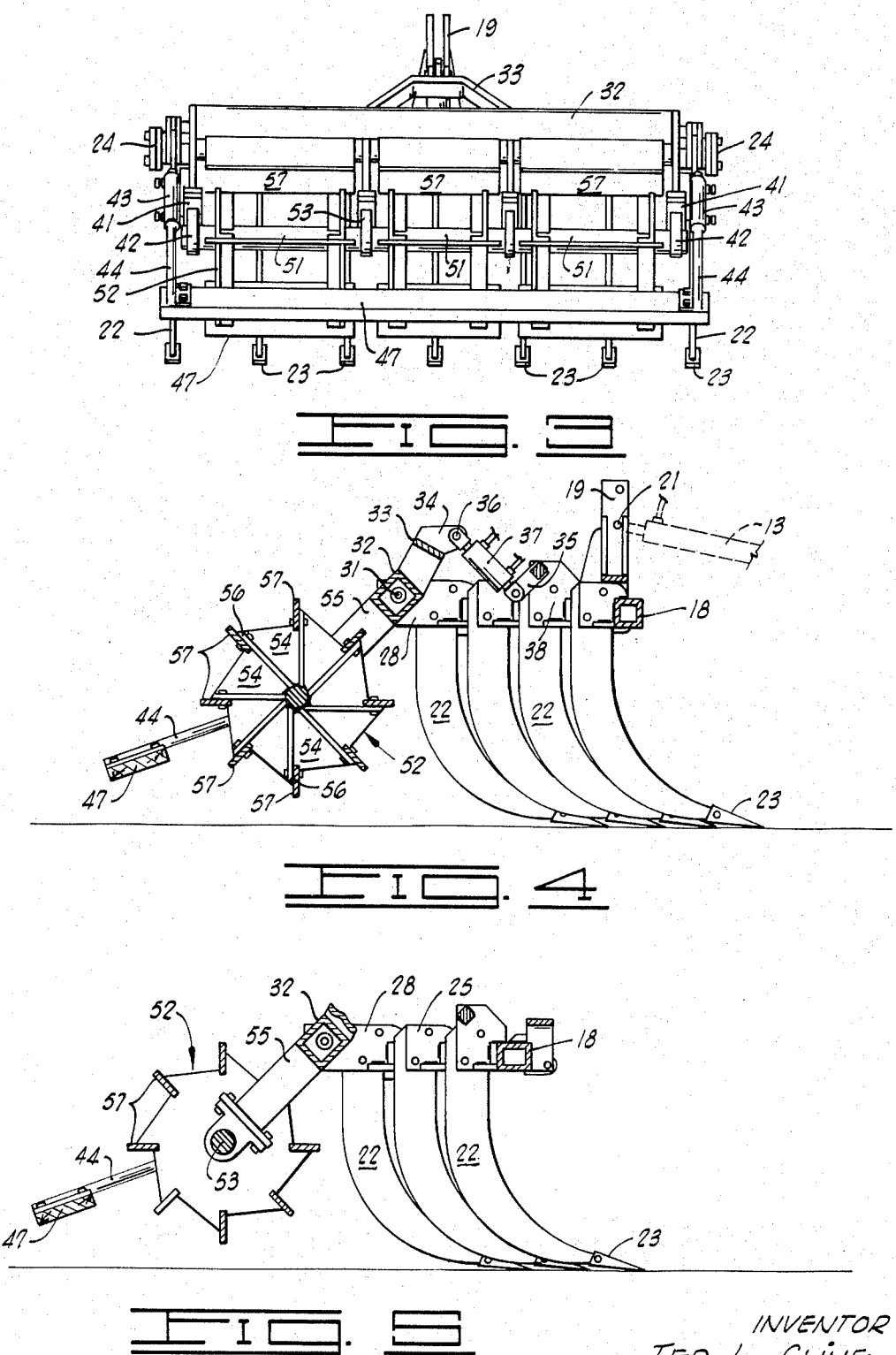

TILLING APPARATUS

BACKGROUND OF THE INVENTION

This invention relates to agricultural implements and more particularly relates to an agricultural implement which may be utilized to break up and smooth earth which has been disturbed by a scarifying implement, such as a chisel plow.

An integral part of almost all agricultural operations involves the use of some type of scarifying implement, such as a chisel plow, disc, moldboard plow or other similar type of farm implement. When apparatus such as these are used, they create an irregular surface, or furrow, on the ground over which they have been drawn. Quite often, such as in operations wherein row crops are being planted, such irregularity is not objectionable and, indeed, is to be desired. However, in other types of operations, this kind of irregularity has, until the present invention, been either accepted with reluctance or overcome by the expenditure of a significant amount of effort. For instance, when it is desired to use a chisel on pasture to break up the hardpan and thereby increase the insoak of water into a pasture, it is necessary to run a harrow after the chisel unless the surface of the pasture is to remain irregular due to the earth which is thrown up by the chisel plow. Similarly, when a moldboard plow is used to turn over stubble, a harrow must be used after the moldboard before the field can be replanted.

In view of the agricultural necessities stated above, attempts have been made to combine the plow with the harrow so that it will not be necessary to work the ground twice for a given result. While in large fields this kind of apparatus can, with certain limitations, be used successfully, it is substantially impossible to maneuver the combined apparatus in the smaller fields due to the inherent awkwardness of the plow and harrow combination. Even in large fields the combined plow-harrow cannot provide suitable corners, and additional operations are necessary if the total area of the field is to be utilized.

In view of the above, it is an object of the present invention to provide an apparatus which may be utilized to pulverize and level earth thrown up by a plow.

Another object of this invention is to provide an agricultural implement for pulverizing and leveling earth, which apparatus may be maneuvered in relatively small spaces in the fields.

A further object of the present invention is to provide an agricultural implement which is useful for breaking up furrowed soil, which apparatus can be used in conjunction with an ordinary farm plow.

BRIEF DESCRIPTION OF THE DRAWINGS

Other objects and advantages of the invention will become apparent as the following detailed description is read in conjunction with the accompanying drawings which illustrate one embodiment of the invention, wherein like reference numerals indicate like elements and wherein:

FIG. 3 is a rear view of the apparatus shown in FIGS. 1 and 2, disclosing the relationship of a plurality of pulverizing means having horizontally aligned rotary axles.

FIG. 4 is a cross-sectional view taken along line 4—4 of FIG. 2 showing the method in which the pulverizing apparatus is moved in an arc around the plow.

FIG. 5 is a cross-sectional view taken along line 5—5 of FIG. 2 showing the method of attachment of a portion of the pulverizing apparatus to an upper frame.

GENERAL DESCRIPTION OF A PREFERRED EMBODIMENT OF THE PRESENT INVENTION

Figure 1:
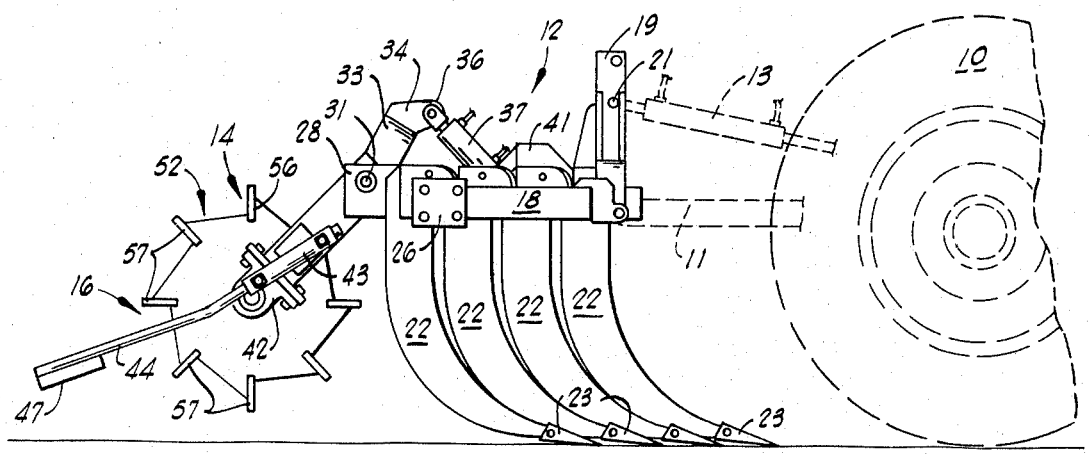
FIG. 1 is a side view of one form of apparatus embodying the present invention showing the relationship of the apparatus to a tractor.

Turning now to the drawings and specifically to FIG. 1, there is shown one form of apparatus which embodies the present invention. Such apparatus is designed to be pulled behind a tractor indicated by the numeral 10 by attaching means such as a hitch 11. Immediately behind hitch 11 is located scarifying means, such as a chisel plow, indicated generally by numeral 12, which is positioned behind the tractor so as to engage and create furrows in the surface of the earth. The depth of the plow in the earth and the resulting height of the furrows is controlled by means of a hydraulic cylinder 13 which is shown for background purposes only, and which forms no part of the present invention. Immediately behind plow 12 and in a position to engage the furrows which are created by the plow, there is provided pulverizing means indicated generally by the number 14 which is rotated by frictional engagement with the furrows, and which acts to reduce the size of the particles of earth thrown up by plow 12. An elongated, horizontally-extending leveling blade assembly 16 is carried by a portion of pulverizing means 14 in such a position as to engage and smooth the earth immediately behind the pulverizing means.

When the apparatus which was described in very general terms immediately above is used, it may be seen that, in general, furrows are created in the earth by plow 12 after which any large clods which are in the furrows are reduced in size by the cutting action of pulverizing means 14. After thus being reduced in size, the particles are leveled and scattered in their subsequent engagement by leveling blade assembly 16 to provide a smooth, cultivated surface in one pass of the machinery.

DETAILED DESCRIPTION OF A PREFERRED EMBODIMENT OF THE PRESENT INVENTION

Figure 2:
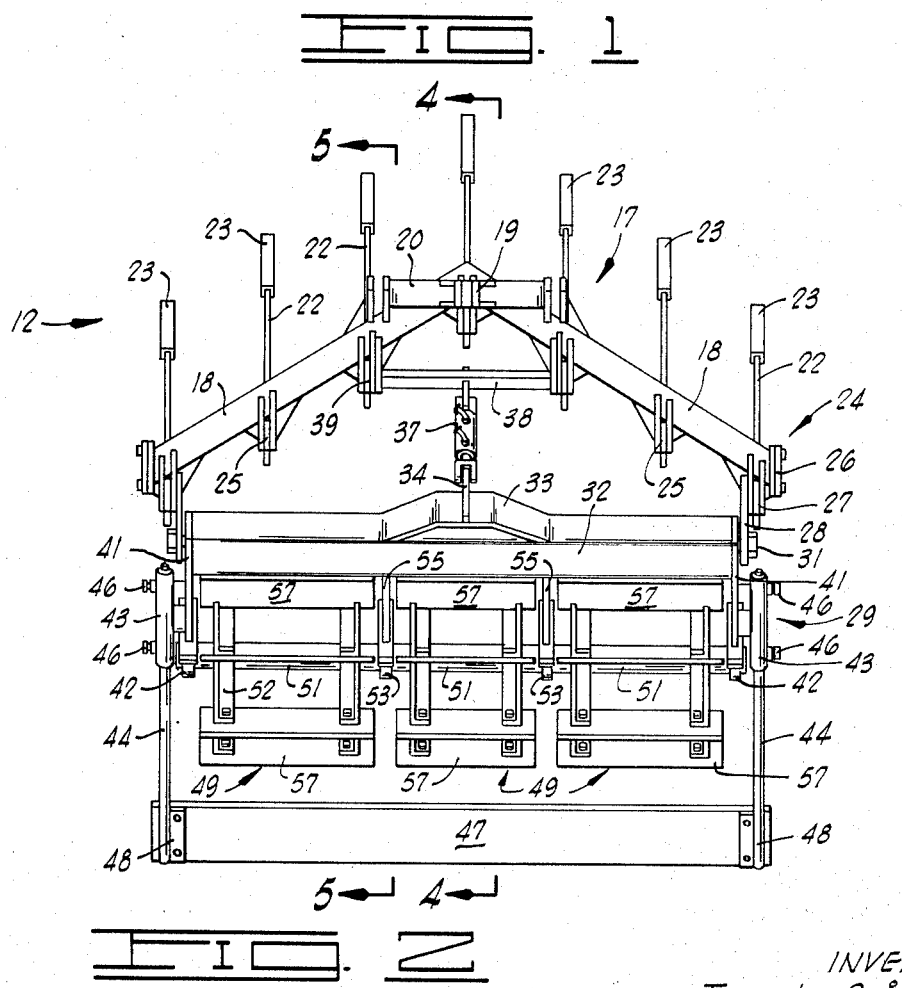
FIG. 2 is a top plan view of the apparatus shown in FIG. 1 disclosing the array of plow parts and their relationship to a pulverizing means.

The specific structural details of a preferred embodiment of this invention may best be understood by first referring to FIGS. 1 and 2. In these figures it will be seen that plow 12 includes a frame 17 comprising a pair of horizontal members 18 which intersect at the front of the plow at an obtuse angle and extend therefrom in a horizontal plane to a rearward, side portion of the plow. At the point of intersection of members 18 there is provided a vertical pivot arm 19 which extends in an upward direction from the plane of members 18 and is rigidly secured to a laterally extending reinforcing element 20 carried on the upper surface of members 18. Cylinder 13, which was introduced in the general description of the apparatus, is pivotally secured by means of a pivot pin 21 to an upper portion of arm 19 to provide pivoting action to the plow 12 and pulverizing means 14 in an arc around the rear of tractor 10.

Extending from the lower portion of members 18 are a plurality of plow shanks 22, each of which is curved toward tractor 10 and terminates in a wedge shaped chisel blade 23. A plow shank mounting bracket 25 is provided at the upper portion of each of the shanks to rigidly secure the shanks to frame 17.

The rearward portion of each of the horizontal members 18 carries a pivot assembly 24 which includes a pair of reinforcing plates 26. Adjacent the innermost reinforcing plate 26 is a brace assembly 27 mounted on each of the horizontal members 18. A horizontal, rearwardly extending arm 28 is formed integrally with brace assembly 27 and has pivotally secured thereto a portion of a pulverizer frame indicated generally by the numeral 29.

Frame 29 is pivotally mounted on arms 28 by means of pivot bolts 31 and includes a forward, horizontal brace 32 which, as best shown in FIGS. 4 and 5, is hollow and has a rectangular cross section to provide rigidity to the structure. A raised, upwardly extending platform 33 extends from the central portion of brace 32 and has secured to the center of the upper surface thereof a connecting arm 34 which is used in adjusting the position of pulverizer means 14. A hinge bolt 36 passes through the outer end of arm 34 and forms a movable connection therewith. Hinge bolt 36 is in turn engaged by a portion of a hydraulic cylinder 37, the opposite end of which is pivotally mounted on an anchor member 38 by means of a toggle lever 35. The forward end of cylinder 37 is restrained against motion relative to frame 17 by means of rigid, upwardly extending, braced, connecting plates 39 which function to secure the ends of anchor member 38 to the forward portion of horizontal members 18. With this assembly, cylinder 37 may be actuated to pivot pulverizing means 14 around pivot bolt 31 when it is desired to increase or decrease the depth at which the pulverizing means operates.

In addition to the elements disclosed heretofore as forming a part of pulverizer frame 29, there is also included at each end of brace 32 a rigid carrier arm 41, each of which moves as a unit with brace 32 and each of which has secured on its outer end an axle journal assembly 42. In addition to journal assembly 42, each of the carrier arms 41 also supports a sleeve 43 which is positioned on the outside surface of each of the arms and which extends backwardly and downwardly across a portion of journal assembly 42. Cantilever arms 44 are slidably disposed within each of the sleeves 43 and their position relative to the sleeves is controlled by a pair of set screws 46. Cantilever arms 44 form a portion of leveling blade assembly 16, which assembly also includes a transversely extending blade 47, the ends of which are secured to and carried by the outer ends of cantilever arms 44 by means of brackets 48.

Three horizontally aligned, independently movable reel type pulverizers, indicated generally by the numeral 49, are rotatably mounted on the rear of pulverizer frame 29 in a position to engage dirt thrown up by plow 12. Each of the pulverizers 49 comprises a horizontal, laterally extending rotary axle 51 at the ends of each of which are rigidly secured a pair of radially extending mounting means, such as disc members 52. The outside ends of the two exterior axles 51 are rotatably journaled into journal assemblies 42 which are carried by arms 41. A pair of similar journal assemblies 53 are mounted on journal arms 55 which extend downwardly and rearwardly from brace 32 and are spaced at approximately equal intervals between the outside journal assemblies 42. Journal assemblies 53 function to rotatably secure both ends of the interior axle 51 and the interior ends of the two outside axles to provide rotary mounts for pulverizers 49.

As best shown in FIG. 4, disc members 52 are made up of a plurality of wedge shaped elements 54 which are formed so that the opposite sides thereof are of different lengths with the longer side of one element being rigidly secured to the shorter side of the next adjacent element to form a step 56 therewith. Steps 56 between the pairs of disc members 52 which are mounted on a single axis 51 are horizontally aligned, and a horizontal, laterally extending blade is secured to and between the steps. The plane of the blade extends radially from its associated axle 51 and the outer edge of the blade projects beyond the outer periphery of disc members 52. Because of the projection of the blades radially beyond the periphery of disc members 52, it is possible for the blades to encounter and cut the earth thrown up by plow 12 without undue interference from the disc members.

OPERATION OF THE APPARATUS

In considering the operation of the apparatus described heretofore, let it be assumed that plow 12 is in the position shown in FIG. 1 with pulverizing means 14 also in the FIG. 1 position. Before operating the device, cylinder 37 will be actuated to rotate connecting arm 34 in a counter-clockwise direction, thereby moving the pulverizing means 49 into engagement with or closely superjacent to the surface of the ground. If desired, set screws 46 may be loosened and leveling blade assembly 16 moved backward and downward to bring leveling blade 47 into closer proximity with the surface of the earth in order to insure a better leveling action by the blade. After this adjustment has been made, set screws 46 are tightened and tractor 10 is placed in motion in a direction to the right, as shown in FIG. 1. As the tractor begins to move, chisel blades 23 are thrust into the ground, forming a series of parallel furrows behind the blades. These furrows engage pulverizing blades 57 and cause rotary motion of pulverizers 49 whereupon any large clods in the furrows are reduced by blades 57 to a relatively small size. As pulverizers 49 move away from the portion of the furrows which has thus been reduced in size, leveling blade 47 encounters and smooths the surface to form a relatively level plane or surface on the earth.

It will be understood that the embodiment described herein is presented by way of example only and that many changes and modifications thereto may be made without departing from the spirit of the invention and the scope of the annexed claims.

What I claim is:

1. Apparatus designed for use with a plow which comprises:
    a pulverizer frame;
    attaching means secured to said frame for attaching the frame to a plow; and
    pulverizing means carried by said frame for pulverizing earth thrown up by the plow, said pulverizing means comprising:

a horizontal, rotary axle;

a plurality of radially-extending blades, each of said blades having a longitudinal axis oriented parallel to said axle; and a plurality of disc-shaped members mounted along the axle in spaced relationship to each other with the central portion thereof rigidly secured to said axle, each of said disc-shaped members comprising a plurality of wedge-shaped elements secured to each other at the edges thereof, one edge of each of said elements being larger than the opposite edge thereof and larger than the edge of the adjacent element to which it is secured whereby a step is formed between adjacent wedge-shaped elements, each of said disc-shaped members having regularly spaced around the outer periphery thereof, means for securing said blades thereto.

2. The apparatus defined in claim 1 wherein said blades are mounted on the disc member at said steps.

3. The apparatus defined in claim 2 further characterized by a plurality of horizontally-aligned pulverizing means secured to said frame on the underside thereof.

4. The apparatus defined in claim 3 further characterized by fluid operated power means for pivoting the frame in an arc around a portion of said plow.

5. The apparatus defined in claim 4 further characterized by an elongated horizontally-extending leveling blade assembly secured to said frame in a position behind and below said rotary axle.

6. A farm implement comprising:

a horizontally-extending plow frame having a forward edge and a rear edge;

a plow mounted on the forward edge of said frame;

a pulverizer frame carried at the rear edge of the plow frame and mounted thereon for arcuate motion with relation thereto by pivotation of said pulverizer frame about a horizontal axis extending through said pulverizer frame;

pulverizer means carried by the pulverizer frame in a position behind the plow, said pulverizer means comprising:

a horizontal, rotary axle;

a plurality of radially-extending blades, each of said blades having a longitudinal axis oriented parallel to said axle; and mounting means for securing said blades for rotation with the axle; and power means operatively connected to the plow frame and to the pulverizer frame for pivoting the pulverizer frame in an arc with relation to the plow.

7. The apparatus defined in claim 6 and further characterized by an elongated, horizontally-extending leveling blade assembly adjustably secured to said pulverizer frame in a position behind and below said rotary axle and adapted for position adjustment rearwardly and downwardly with respect to said rotary axle.

8. The apparatus defined in claim 6 wherein said power means comprises a hydraulic cylinder.

9. The apparatus defined in claim 8 wherein said mounting means comprises a disc-shaped member having regularly spaced thereon, on the outer periphery thereof, means for securing said blades, the central position of said member being rigidly secured to the axle.

10. The apparatus defined in claim 9 wherein a plurality of said disc members are mounted along the axle in spaced relationship to each other.

11. The apparatus defined in claim 10 wherein each of said disc members comprises a plurality of wedge-shaped elements secured to each other at the edges thereof, one edge of each of said elements being larger than the opposite edge thereof and larger than the edge of the adjacent element to which it is secured, whereby a step is formed between each adjacent wedge-shaped element, said blades being mounted on said disc members at said steps.

12. The apparatus defined in claim 11 further characterized by an elongated horizontally-extending leveling blade secured to said pulverizer frame in a position behind and below said rotary axle.

13. Apparatus designed for use with a plow which comprises:

a pulverizer frame;

attaching means secured to said frame for attaching the pulverizer frame to a plow; and pulverizer means carried by said pulverizer frame for pulverizing earth thrown up by the plow, said pulverizer means comprising:

a horizontal, rotary axle;

a plurality of radially extending blades, each of said blades having a longitudinal axis oriented parallel to said axle, with the axes of said blades extending parallel to each other; and a plurality of disc members mounted along the axle in spaced relation to each other, said disc members having regularly spaced thereon, at the outer periphery thereof, said radially extending blades;

sleeve means mounted at the outer ends of said pulverizer frame;

an elongated, horizontally extending leveling blade assembly adjustably secured to said pulverizer frame, said leveling blade assembly having arms extending into said sleeve means for sliding therein, said blade assembly being positioned behind and below said rotary axle and clear of the rotational path of said blades, said leveling blade assembly further including a leveling blade simultaneously adjustable in a vertical direction and in a horizontal direction; and means for securing said leveling blade assembly arms at a selected position in said sleeve means whereby the vertical and horizontal position of said leveling blade in said pulverizing means may be adjusted.

* * * * *